(12) United States Patent
Aida et al.

(10) Patent No.: US 10,822,171 B2
(45) Date of Patent: Nov. 3, 2020

(54) QUALITY CONTROL SYSTEM AND QUALITY CONTROL METHOD

(71) Applicant: HITACHI, LTD., Tokyo (JP)

(72) Inventors: Kohhei Aida, Tokyo (JP); Masahiro Kawasaki, Tokyo (JP); Shunsuke Mori, Tokyo (JP); Hiroshi Sasaki, Tokyo (JP); Yuya Tokuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 136 days.

(21) Appl. No.: 16/324,116

(22) PCT Filed: Jun. 30, 2017

(86) PCT No.: PCT/JP2017/024098
§ 371 (c)(1),
(2) Date: Feb. 7, 2019

(87) PCT Pub. No.: WO2018/030025
PCT Pub. Date: Feb. 15, 2018

(65) Prior Publication Data
US 2019/0210806 A1  Jul. 11, 2019

(30) Foreign Application Priority Data
Aug. 9, 2016  (JP) .................. 2016-156079

(51) Int. Cl.
*B65G 1/137* (2006.01)
*B65G 61/00* (2006.01)
(Continued)

(52) U.S. Cl.
CPC .......... *B65G 1/1376* (2013.01); *B65G 61/00* (2013.01); *G06Q 10/08* (2013.01); *G06Q 50/28* (2013.01); *B65G 2203/0216* (2013.01)

(58) Field of Classification Search
CPC combination set(s) only.
See application file for complete search history.

(56) References Cited

U.S. PATENT DOCUMENTS 9,652,775 B2 *  5/2017  Costa ..................... G06Q 30/02
9,798,990 B2 * 10/2017  Weng ..................... G06Q 10/06
(Continued)

FOREIGN PATENT DOCUMENTS

| CN | 102592208 A | 7/2012 |
| JP | 2000-131152 A | 5/2000 |

(Continued)

OTHER PUBLICATIONS

International Search Report for PCT/JP2017/024098, dated Sep. 26, 2017.
(Continued)

*Primary Examiner* — Kyle O Logan
(74) *Attorney, Agent, or Firm* — Volpe Koenig

(57) ABSTRACT

A quality control system includes a control device, an output device, and an input device placed at at least an end point of a distribution channel of articles; the input device includes an input unit for receiving data on a changed environment portion and a communication unit that transmits the data, information about an input location, and an input time to the control device. The control device includes a storage unit for storing the mode of packing of the articles in the distribution channel, a reception unit for receiving the information from the input device, an arithmetic operation unit that calculates the number of articles deviating from the storage environment and estimates the stage of the distribution channel deviating from the storage environment, and a transmission unit for transmitting calculation result to the output device that is provided with a display unit.

12 Claims, 10 Drawing Sheets

(51) Int. Cl.
*G06Q 10/08* (2012.01)
*G06Q 50/28* (2012.01)

(56) References Cited

U.S. PATENT DOCUMENTS

| | | | | |
|---|---|---|---|---|
| 10,089,594 | B2* | 10/2018 | Gray | H04B 10/116 |
| 2007/0150113 | A1* | 6/2007 | Wang | G05D 7/0641 |
| | | | | 700/282 |
| 2010/0198905 | A1* | 8/2010 | McKay | H04L 67/025 |
| | | | | 709/203 |
| 2012/0175412 | A1* | 7/2012 | Grabiner | G16H 15/00 |
| | | | | 235/375 |
| 2015/0302349 | A1* | 10/2015 | Atkinson | G06K 19/0717 |
| | | | | 705/333 |
| 2016/0047578 | A1* | 2/2016 | Warren | F25B 41/04 |
| | | | | 62/115 |

FOREIGN PATENT DOCUMENTS

| | | |
|---|---|---|
| JP | 2002-087542 A | 3/2002 |
| JP | 2002-215043 A | 7/2002 |
| JP | 2005-314073 A | 11/2005 |
| JP | 2006-062864 A | 3/2006 |
| JP | 2007-314255 A | 12/2007 |
| WO | 2009/150641 A1 | 12/2009 |

OTHER PUBLICATIONS

Extended European Search Report dated Oct. 30, 2019 for the European Patent Application No. 17839099.3.
Chinese Office Action dated Mar. 19, 2020 for the Chinese Patent Application No. 201780045044.8.

* cited by examiner

| DETECTION SITE | NUMBER OF DELIVERED ARTICLED | NORMAL | ABNORMAL |
|---|---|---|---|
| I | 36 | 35 | 1 |
| J | 24 | 24 | 0 |
| K | 36 | 36 | 0 |
| L | 60 | 60 | 0 |
| M | 48 | 48 | 0 |
| N | 72 | 70 | 2 |
| O | 36 | 36 | 0 |

Fig. 9

| DETECTION SITE | NUMBER OF DELIVERED ARTICLED | NORMAL | ABNORMAL |
|---|---|---|---|
| I | 36 | 36 | 0 |
| J | 24 | 12 | 12 |
| K | 36 | 36 | 0 |
| L | 60 | 60 | 0 |
| M | 48 | 48 | 0 |
| N | 72 | 72 | 0 |
| O | 36 | 36 | 0 |

Fig. 10

| DETECTION SITE | NUMBER OF DELIVERED ARTICLED | NORMAL | ABNORMAL |
|---|---|---|---|
| I | 36 | 36 | 0 |
| J | 24 | 24 | 0 |
| K | 36 | 36 | 0 |
| L | 60 | 36 | 24 |
| M | 48 | 36 | 12 |
| N | 72 | 72 | 0 |
| O | 36 | 36 | 0 |

Fig. 11

| DETECTION SITE | NUMBER OF DELIVERED ARTICLED | NORMAL | ABNORMAL |
|---|---|---|---|
| I | 36 | 36 | 0 |
| J | 24 | 24 | 0 |
| K | 36 | 36 | 0 |
| L | 60 | 60 | 0 |
| M | 48 | 48 | 0 |
| N | 72 | 0 | 72 |
| O | 36 | 0 | 36 |

Fig. 12

QUALITY CONTROL SYSTEM AND QUALITY CONTROL METHOD

TECHNICAL FIELD

The present invention relates to a system and a method for controlling the qualities of plural articles that are distributed through plural distribution channels.

BACKGROUND ART

There are some articles for which appropriate controls over environment conditions regarding temperature, humidity, vibration, gas, barometric pressure, and the like are necessary among articles which are transported from their manufacturing sites to their consuming regions through plural distribution channels. For example, there are some food products that become unfit to eat because they spoil or their tastes change in the case where they are put under high temperature or low temperature environments. In addition, there are some food products the qualities of which are deteriorated when they are put under high humidity environments or under an oxygenic environment having an atmospheric oxygen level. Furthermore, there are some articles that are destroyed when they are put under the influence of a vibration the magnitude of which is larger than anticipated.

In order to cope with the above-mentioned problems, when articles are transported or stored, control measures are taken by storing articles in airtight containers, by controlling temperature and humidity using air conditioning apparatuses of transport containers, transport autotrucks, and safekeeping rooms, and by executing vibration control through vibration measurements. It sometimes happens that environment conditions surrounding the articles depart from control ranges (desirable environment conditions) owing to the failures of the apparatuses or the negligences of the controls.

In the case where an environment condition surrounding an article departs from the relevant control range, in order to make it easier to specify a cause for the departure or a site where the departure happens, it is commonly practiced that the article is given a control number in advance at the time when the article is manufactured, and the control number of the article, which is handled at plural sites and by plural dealers, is input into a control system, and the data on the article is analyzed. Control numbers are input into the control system at plural sites (bases) of the distribution channels of articles where the articles are manufactured, transported, and sold.

Patent Literature 1 discloses a system in which control data and the temperatures of articles are detected at the same time at plural sites of a distribution channel of the article using bar-code readers each of which is equipped with a temperature measurement device, and the control data are transmitted to a control apparatus, so that the history of the articles can be checked. This system uses combinations of bar-codes and temperature-indicating figures that change their colors depending on temperatures.

CITATION LIST

Patent Literature

Patent Literature 1: Japanese Unexamined Patent Application Publication No. 2002-87542

SUMMARY OF INVENTION

Technical Problem

When articles are transported from their manufacturing sites to their consuming regions through plural distribution channels, the modes of packing of the articles (the modes of packing are the ways the articles are packed article by article, by the cardboard box of articles, by the pallet of articles and the like) are often changed in accordance with the change of the amount of the articles in the distribution channels. Particularly, in stages near to the final stage of the distribution, the packages have been opened several times as the distribution further proceeds, therefore it often happens that the sizes of the modes of packing become smaller and the articles are often classified into smaller groups. In order to apply the method disclosed in Patent Literature 1, in which control data and the temperatures of articles are detected at the same time at plural sites of a distribution channel of the articles using a bar-code reader which is equipped with a temperature measurement device, to the distribution channel where the modes of packing change, it becomes necessary for numbers and temperature data specified to the respective packages to be attached to the outsides of the respective modes of packing or for the numbers and the temperature data located inside of the respective packages to be detected after the respective packages are opened.

In the system disclosed in Patent Literature 1, it is impossible to detect a site and a time where and when the abnormality of temperature occurs unless numbers and temperature data specified to the respective packages are detected successively in the distribution channel of articles. On the other hand, in order to use the above system for the quality control of a cold chain for inexpensive frozen foods and fresh foods, it is desirable that the number of detection bases and the number of man-hours for detection should be lessened so that burdens on workers can be reduced.

Therefore, the object of the present invention is to provide a system and a method in which burdens on workers can be reduced and a stage of a distribution channel under an environment that deviates from a storage environment can be estimated.

Solution to Problem

A quality control system according to the present invention includes: a control device; an output device; and an input device placed at least at each of the end points of distribution channels of articles. The input device includes an input unit to which data on a changed environment portion is input and a communication unit that transmits, to the control device, the data on the changed environment portion input to the input unit, the relevant input location or information about the position of the input device itself, and the relevant input time. The control device includes a storage unit for storing information about the modes of packing of the articles in the distribution channels, a reception unit for receiving the information transmitted from the input device, an arithmetic operation unit that calculates the number of articles exposed to an environment deviating from the storage environment on the basis of the data on the changed environment portion and that estimates a stage of a distribution channel under an environment deviating from the storage environment on the basis of the number of the articles deviating from the storage environment, the relevant input location or the information about the position of the relevant input device, the relevant input time, and the information about the modes of packing of the articles in the distribution channels, and a transmission unit for transmitting a calculation result to the output device; the output device includes a display unit for displaying the calculation result.

Advantageous Effects of Invention

According to the present invention, a system and a method that make it possible that burdens on workers are reduced and a stage of a distribution channel that deviates from a storage environment is estimated.

BRIEF DESCRIPTION OF DRAWINGS

FIG. 9 is a diagram showing data on changed environment portions at the end points of the distribution channels in a tabular form.

FIG. 10 is a diagram showing data on changed environment Portions at the end points of the distribution channels in a tabular form.

FIG. 11 is a diagram showing data on changed environment portions at the end points of the distribution channels in a tabular form.

FIG. 12 is a diagram showing data on changed environment portions at the end points of the distribution channels in a tabular form.

DESCRIPTION OF EMBODIMENTS

Hereinafter, configurations for materializing the present invention (the configurations will be referred to as embodiments hereinafter) will be explained in detail by appropriately referencing the accompanying drawings. In addition, in the accompanying drawings, the common components are given the same reference signs, and duplicated explanations about these components are omitted.

First Embodiment

A quality control system according to this embodiment controls environment conditions in the distribution channels of articles the modes of packing of which change along with the change of the transport amounts of the articles in the distribution channels. To put it more concretely, at least at the end points of the distribution channels, the quality control system controls the environment conditions surrounding the articles using control numbers given to the articles and information about the modes of packing at the respective distribution channels, and when an abnormality occurs in an environment condition surrounding an article (articles), the quality control system estimates a stage of a distribution channel at which the abnormality occurs with a high possibility. In this specification, the modes of packing of articles are the ways the articles are packed in the transport of the articles. Furthermore, the event that an environment condition surrounding an article (articles) deviates from a control range (a desirable environment condition) is referred to as "an environment abnormality" and an article an environment condition surrounding which deviates from the control range is referred to as "an article of environment abnormality".

The quality control system according to the present invention estimates a site where an environment abnormality occurs regarding an article which is given a changed environment portion that changes when an environment surrounding the article deviates from a storage environment and a control number. The control number of an article is a number representing the type, the kind, the manufactured date, the serial number, and the like of the article, and it is given to the article at a time when the article is manufactured or the like. In addition, in this specification, the following descriptions will be made under the assumption that a control number is represented by a bar-code, but how to represent the control number is not limited to the way the control number is represented by a bar-code. The control number can also be represented using a pattern of usual characters (such as a numeral sequence or a character string).

Figure 1:
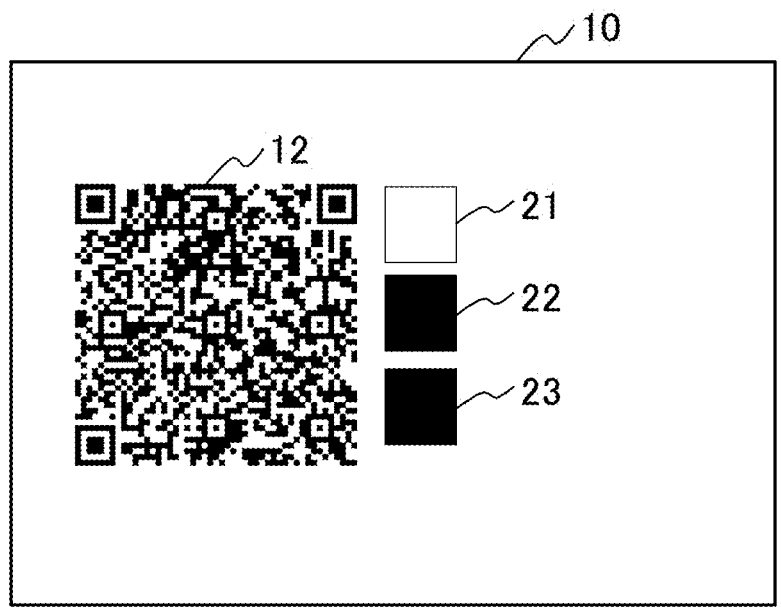
FIG. 1 is a diagram showing an example of an article including a two-dimensional bar-code and changed environment portions.
Figure 2:
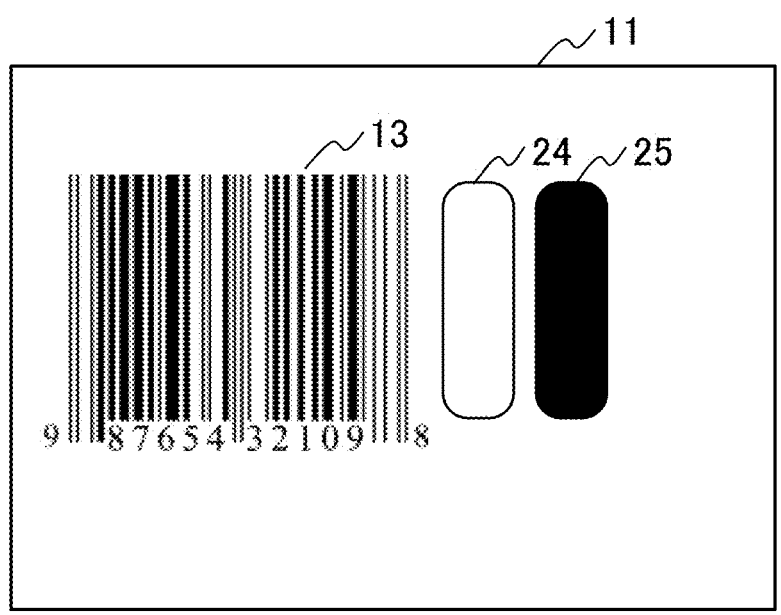
FIG. 2 is a diagram showing an example of an article including a one-dimensional bar-code and changed environment portions.

FIG. 1 and FIG. 2 are diagrams showing examples of articles including bar-codes and changed environment portions respectively. In an article 10 shown in FIG. 1, a typical two-dimensional bar-code 12 and changed environment portions 21, 22, and 23 are shown. In an article 11 shown in FIG. 2, a typical one-dimensional bar-code 13 and changed environment portions 24 and 25 are shown.

In the bar-codes 12 and 13, the control numbers of the articles which are represented by character strings of numerals or alphabets are represented by patterns of bar-codes. Here, the bar-codes 12 and 13 shown in FIG. 1 and FIG. 2 do not represent the character strings of actual control numbers used in this embodiment. Although there are various bar-code standards except that there are various bar-code dimensions, the present embodiment is not subject to these bar-code standards. In addition, although, when character strings are patterned, various pieces of conversion processing may be executed, the present embodiment is not subject to these conversion methods.

Here, in the case where control numbers represented by bar-codes differentiate only the types of articles from one another, signs representing the lot numbers and manufacturing sites of the articles are often given to the articles in patterns of usual characters. In this case, if a combination of a control number represented by a bar-code and a lot number and the like represented by usual characters is newly treated as a control number, the same processing can be executed as in the case where bar-codes representing control numbers are used for differentiating lot units from one another. Similarly, in the case where signs representing a manufacturing date, an expiration date for consumption, and the like are given to an article in a pattern of usual characters, if a combination of these signs and a control number for the article represented by a bar-code is treated as a new control number, the same processing can be also executed as in the case where bar-codes representing control numbers are used for differentiating lot units from one another.

As the changed environment portions 21 to 25, any items can be adopted as long as they can be used for detecting that the articles 10 and 11 deviate from a storage environment. As a changed environment Portion, an item, on which a sort of ink whose color varies in accordance with an environment condition of, for example, temperature, humidity, vibrations, gas, barometric pressure, or the like surrounding an article is printed and which shows the environment condition surrounding the article by the color shown by the ink, can be adopted. Although there are no restrictions on the position, shape, size, number, and the like of a changed environment portion, it is desirable that the color of the changed environment portion (color datum) can be read as an image datum along with the relevant bar-code. For example, it is desirable that the position of a changed environment portion should be disposed in the vicinity of the relevant bar-code. There is no particular restriction on the shape of a changed environment portion, and the shape can be a square, a circle, an oval, a rectangle having rounded corners, or the like. It is desirable that the size should be larger than the size of a bar or a dot of the bar-code, and, for example, the size can be set large enough to be easily checked with eyes.

Furthermore, in the case where, as ink of a changed environment portion, ink the color of which is irreversible after having changed is used, even if an environment condition surrounding the article in a distribution channel gets back to its original state after having changed, it can be judged that the environment condition have deviated from the storage environment. In addition, if the color of ink changes so as to be tinged with medium colors (that is to say, the color changes over plural stages), it becomes possible that the change of the environment condition surrounding the article can be grasped in detail.

In the case where temperature is detected as an environment condition surrounding an article, conventionally used materials such as inorganic thereto chromic materials made of metal complex salts of $CoCl_2$ and the like, and organic thermo chromic materials made of condensed aromatic ring substituents of spiropyran-based compounds and the like can be used. The change of temperature surrounding the article can be detected from the change of the color of the relevant changed environment portion. Furthermore, there are two ways a color changes: one is the way the color reversibly changes and the other is the way the color irreversibly changes. When a color reversibly changes, the color changes many times along with the rises and falls of temperature, and when a color irreversibly changes, the color does not get back to the original color once the color changes at a specific temperature. In the way the color irreversibly changes, a permeable material that is permeated by ink whose viscosity changes in accordance with temperature is prepared in advance, with the result that, when the permeable material is disposed to a temperature equal to or higher than a preset degree of temperature for a certain time, the ink permeates the permeable material and the color of the permeable material can be changed. Ink included in a changed environment portion is not subject to these materials and the kinds and compositions of the permeable materials, and as the changed environment portion, an arbitrary material can be adopted as long as the material changes in accordance with the relevant environment change.

If plural changed environment portions, the changing conditions of the colors of which are different from one another, are disposed at an article, plural environment conditions can be grasped at the same time. For example, for this purpose, it is conceivable that plural changed environment portions whose colors respectively change at different degrees of temperature are disposed, or a changed environment portion whose color changes in accordance with temperature and a changed environment portion whose color changes in accordance with humidity are disposed. The shapes and sizes of the plural changed environment portions can be allowed to be the same as one another or different from one another.

It is desirable that the fact that an article deviates from the storage environment can be detected with eyes using a changed environment portion. Herewith, by observing a changed environment portion with eyes at the end point of a distribution channel, it becomes possible to prevent an article of environment abnormality from being further distributed, and to attract attention to the environment abnormality without reading the changed environment portion.

In the case of using the one-dimensional bar-code 13, it often happens that a bar-code reading device reads data linearly arranged. Therefore, in order for the bar-code reading device to read the color data of the changed environment portions 24 and 25 along with the bar-code, it is desirable that the shapes of the changed environment portions 24 and 25 should be linear shapes, the lengths of the changed environment portions 24 and 25 should be almost equal to the length of the bar-code 13, and the dispositions of the changed environment portions 24 and 25 should be in the same direction as the disposition of the bar-code 13 as shown in FIG. 2. However, the configuration of the one-dimensional bar-code 13 is not limited to the above-mentioned configuration.

Although it is conceivable that the bar-codes 12 and 13, and the changed environment portions 21 to 25 are directly printed on the articles 10 and 11 respectively, a seal on which the bar-codes 12 and 13, and the changed environment portions 21 to 25 are printed can be attached to the articles 10 and 11. Alternatively, a character string representing a control number can be printed in the vicinity of the bar-codes 12 or 13 in a usual form of characters. It is also desirable that descriptions regarding relations between the represented colors (color data) and environment conditions surrounding articles should be added in the changed environment portions 21 to 25 in usual characters or the like as postscripts.

If data representing the presence or absence, the number, the kinds, and the positions of changed environment portions are included in character strings shown by a bar-code, these data can be easily read without fail with a bar-code reading device. However, schemes that can be adopted are not limited to the above-mentioned scheme. One of preferable schemes is a method in which data representing the presence or absence, the number, the kinds, the positions of changed environment portions, and the like as well as a control number are included in character strings shown by a bar-code. This data is represented by, for example, "1234567; count=3; temperature 10, 1.2, 0.1; temperature 20, 1.2, 0.2; moisture, 1.2, 0.3", or the like. In this example, an item "1234567" is a control number representing an article. An item "count=3" shows that there are three kinds of changed environment portions. It is not always necessary for all the items except for the control number to be represented in the above data. An item "temperature 10, 1.2, 0.1" shows that a changed environment portion which changes at 10 degrees of temperature is deposed at a position having an abscissa 1.2 and an ordinate 0.1. Although a position can be shown by an actual distance (in millimeters or the like) from an arbitrary reference point, it is preferable that the position should be shown by a relative position using the size of a bar-code. For example, in FIG. 1, it will be assumed that a coordination system has its origin at the uppermost left vertex of the two-dimensional bar-code 12, an abscissa 1 at the uppermost right vertex, and an ordinate 1 at the lowermost left vertex, and that the center positions of the changed environment portions 21 to 23 are shown by this coordination system. With the use of this coordination system, even if the changed environment portions are disposed at any positions, the color data of the changed environment portions can be read.

The bar-codes and the data on the changed environment portions that have been described so far and that are attached to articles are input into the relevant input device by a person who deals with the articles. The input into the input device is executed at least at each of the endpoints of the distribution channels of the articles.

<Quality Control System>

Figure 3:
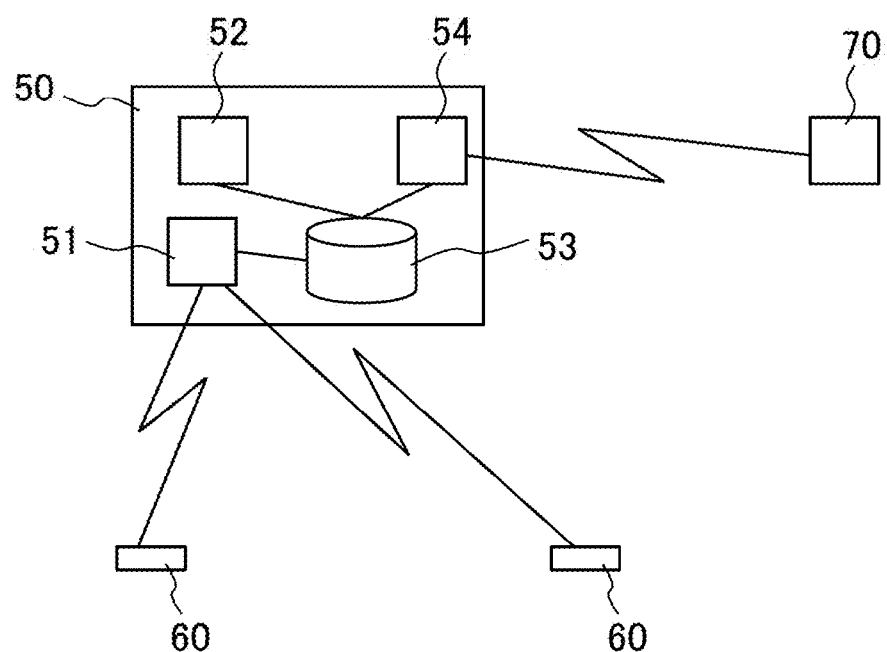
FIG. 3 is a diagrammatic illustration showing the configuration of a quality control system.

FIG. 3 is a diagrammatic illustration showing the configuration of the quality control system according to this embodiment. The quality control system includes a control device 50, input devices 60, and an output device 70. The input devices and the output device can be integrated into one device as a terminal device.

An input device 60 includes an input unit into which data on control numbers and data on changed environment portions shown by the articles 10 and 11 are input, and a communication unit. The communication unit transmits the input data (the data on the control numbers and the data on the changed environment portions of the articles), an input location where the data is input or the information about the position of the input device itself into which the data is input, and the relevant input time to the control device 50. As the input device 60, a reading device (for example, a bar-code reader), using which the bar-codes 12 and 13 can be read and, at the same time, the color data of the changed environment portions 21 to 25 can be read as image data, can be adopted. When data represented in the forms of usual characters are manually input, a key board can be adopted as the input device 60. Although it is necessary that an input device should be placed at least at the end point of each distribution channel, it is also conceivable that input devices are placed at several bases of each distribution channel.

The control device 50 includes a data reception unit 51, an arithmetic operation unit 52, a data transmission unit 54, and a data storage unit 53, and it is composed of a commonly used computer. The data reception unit 51 receives data transmitted from an input device 60 and stores the data in the data storage unit 53 of the control device 50. Furthermore, information about the modes of packing of articles in the respective distribution channels is stored in advance in the storage unit 53. It is preferable that the information about the modes of packing of the articles in the respective distribution channels should be accordingly updated when any of the respective distribution channels is changed, or the way any of the articles is packed is changed. The arithmetic operation unit 52 executes arithmetic operation processing, and records data of the calculation result in the data storage unit 53. The arithmetic operation unit 52 calculates the number of articles that deviate from the storage environment judging from data of the changed environment codes of the respective articles received by the data reception unit. A stage of a distribution channel that deviates from the storage environment is estimated on the basis of the number of the articles, the relevant input location or information about the position of the relevant input device, the relevant input time, and information about the modes of packing in the respective distribution channels stored in the storage unit. The data transmission unit 54 transmits the data recorded in the data storage unit 53 to the output device 70.

The output device 70 includes a display unit that displays data output by the control device 50, that is to say, the calculation result obtained by the control device 50 and the data brought in by the input devices 60 on the screen of its own. It is conceivable that the output device and the control device are installed one-on-one, or plural output devices are installed at respective bases in distribution channels.

Hereinafter, a method in which a stage of a distribution channel that deviates from a storage environment is estimated using the quality control system according to this embodiment.

Figure 4:
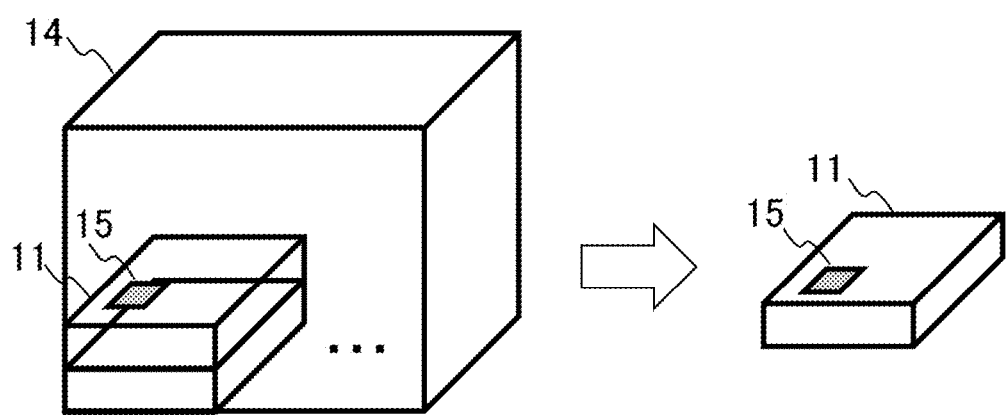
FIG. 4 is a diagram showing an example of a change between the modes of packing at two stages of a distribution channel.

FIG. 4 is a diagram showing an example of a change between the modes of packing in a distribution channel. In FIG. 4, at the start point of the distribution channel, boxes each of which includes plural articles 11 are packed in a package 14 and transmitted, and the respective articles 11 are brought out from the boxes in the middle of the distribution channel or at the end point of the distribution channel. When the articles 11 are in the package 14, it is necessary to open the package 14 in order to read the changed environment portions 16 attached to the respective articles 11, so that burdens on workers are increased. Therefore, in the quality control system according to this embodiment, burdens on the workers are reduced by decreasing the number of sites where changed environment portions are read.

In the quality control system according to this embodiment, a stage of the distribution channel under an environment that deviates from the storage environment is estimated by reading changed environment portions given to the respective articles 11 at least at the end point of the distribution channel. In order to estimate a stage of the distribution channel where an environment abnormality occurs, it is necessary to grasp how many articles 11 are packed in the package 14, and at which stage of the distribution channel the package 14 is opened and divided into the respective articles 11. If the modes of packing in respective distribution channels can be grasped, how many articles are packed in packages and transported can be judged. Therefore, in the quality control system according to this embodiment, the storage unit of the control device is made to store the modes of packing in the respective distribution channels.

Figure 5:
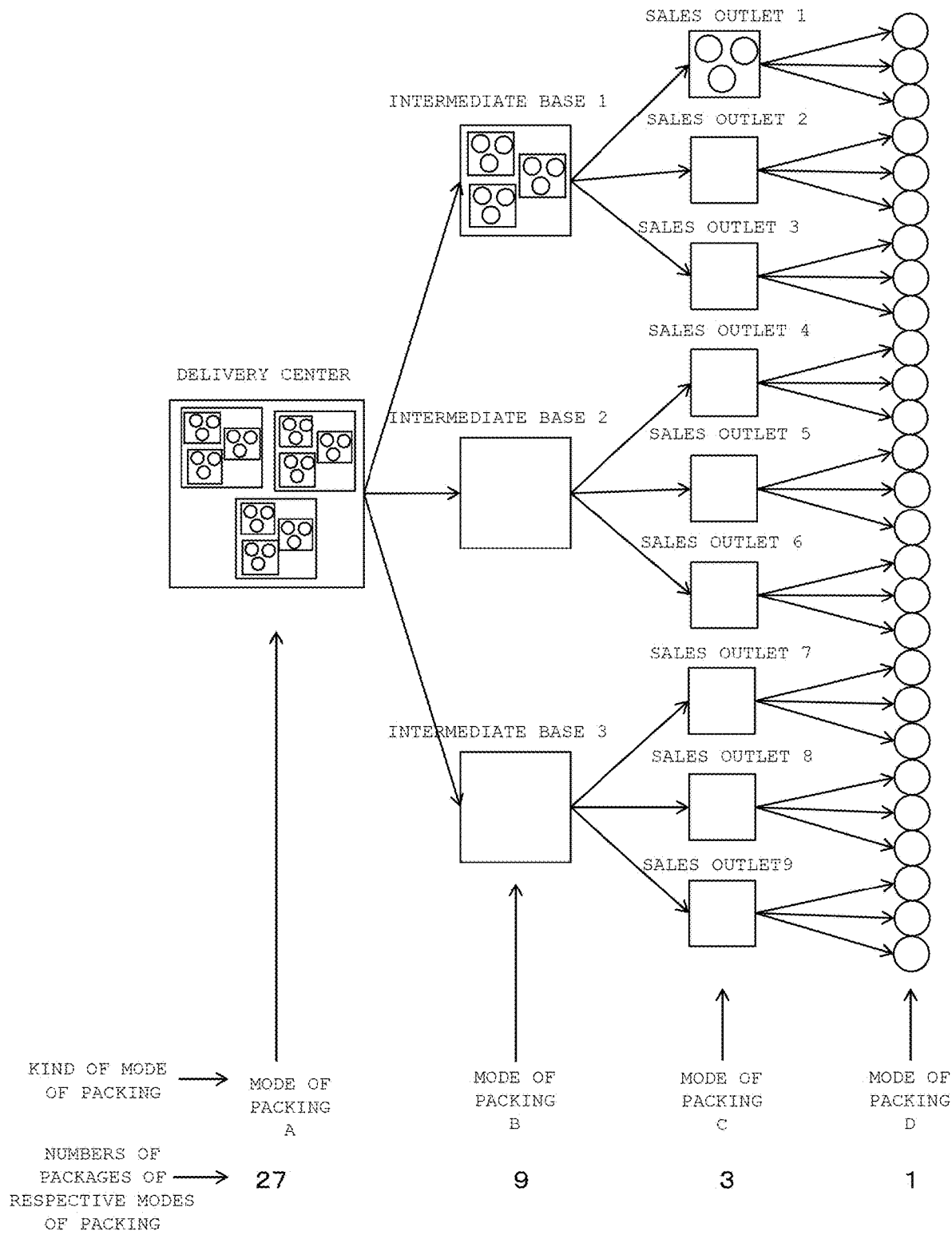
FIG. 5 is a diagram schematically showing changes between the modes of packing at the stages of distribution channels.

FIG. 5 is a diagram schematically showing the changes between the modes of packing of articles in distribution channels. In FIG. 5, when one mode of packing A is opened, three modes of packing B appear. When one mode of packing B is opened, three modes of packing C appear. When one mode of packing C is opened, three modes of packing D appear. The articles are delivered from a delivery center to sales outlets 1 to 9 via any of intermediate bases 1 to 3 The articles are delivered to the intermediate bases 1 to 3 in the state of the mode of packing B, and delivered to the sales outlets 1 to 9 in the state of the mode of packing C. In how many number units certain articles are packed and at which stages in the distribution channels the modes of packing of the certain articles change are stored in advance as mentioned above.

Figure 6:
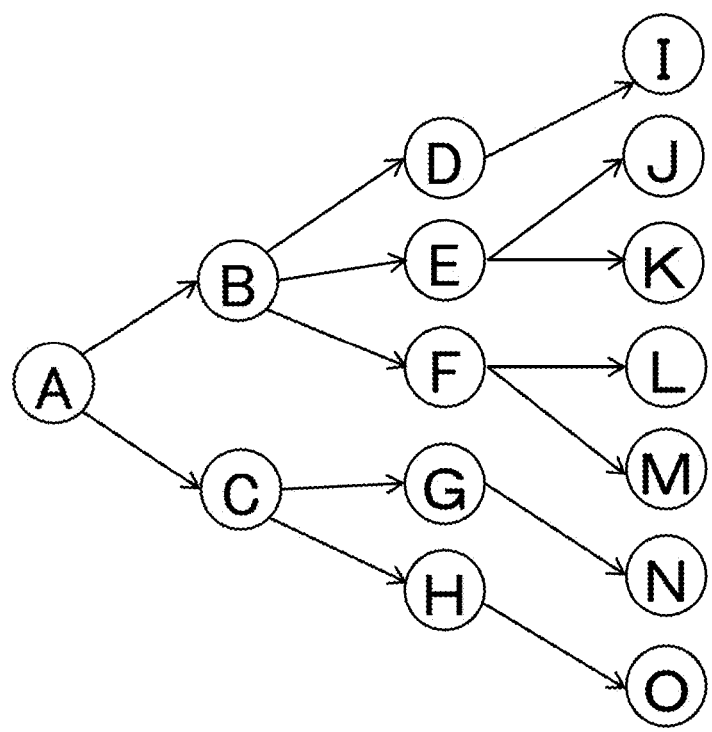
FIG. 6 is a diagram schematically showing distribution channels of articles.

FIG. 6 is a diagram schematically showing distribution channels of articles. Nodes A to O represent the sites (bases)

such as manufacturing locations, distribution centers, sales outlets, and the like, and each arrow represents a transportation channel between two nodes. In FIG. 6, the node A represents the start point (manufacturing location or the like) for the distribution channels of the articles, and the nodes I to O represents the end points of the distribution channels (the sales outlets or the like).

At the node A that is the start point of the distribution channels, it is preferable to check that there is no article of environment abnormality. In order to check the above, it is preferable that changed environment portions for the respective articles should be read before the articles are packed.

The bases represented by the node B to H are bases that are located between the start point and the end points of the distribution channels of the articles, and these bases are distribution centers, distribution warehouses, wholesale stores and the like. At these bases, it is not indispensable for changed environment codes to be read.

At the end points of the distribution channels of the articles represented by the nodes I to O, the control numbers and the color data of the changed environment portions for the respective articles are input into input devices 60 at arbitrary time points during the arrivals and the sales of the articles. The input devices 60 transmit the control numbers, the color data of the changed environment portions, the relevant input dates, the relevant input locations for the respective articles 10 and 11 to the control device 50. In these cases, when distinction data for distinguishing operators of the input devices 60, distinction data for distinguishing the input devices 60, and the like are input into the input devices 60 and transmitted to the control device 50, these data can be used for various analyses executed by the control device 50 later. Although, as data of the input locations, it is conceivable that the names or addresses of the input locations are used, latitudes and longitudes that show information about the position of the input devices can also be used. Especially in the case where sales sites at which articles are sold are mobile, it is more preferable for data to be shown in the form of being geographically easily treated, that is, to be shown by the latitudes and longitudes of the sales sites. The input devices 60 indispensably bring in the data at the end points of the distribution channels of the articles. In other words, sites where the last data are read in the respective distribution channels are the end points of the respective distribution channels according to this embodiment.

In addition, it is conceivable that data on relations between the color data of the changed environment portions and the environment conditions surrounding the articles are stored in advance in the input devices 60. For example, in the case where items using which the presence or absence of environment abnormalities cannot be judged with eyes are used in the changed environment portions, even if the input devices 60 do not transmit data to the control device 50, whether the quality controls of the articles are good or bad (that is to say, whether there are environment abnormalities or not) can be judged when the color data is input, and when the quality control of an article is bad (that is to say, when there is an environment abnormality), it becomes possible to display a warning or to make a warning sound. Alternatively, if reference values are included in the character strings shown by a bar-code, whether the quality controls of the articles are good or not can be judged using these reference values.

The control device 50 records data transmitted from the input devices 60 in the data storage device 53. The arithmetic operation unit of the control device 50 calculates the number of articles that deviate from the storage environment on the basis of the color data of the changed environment portions included in the data transmitted from the input devices 60. Subsequently, the arithmetic operation unit estimates a stage of a distribution channel deviating from the storage environment on the basis of the number of articles deviating from the storage environment, the information about the position of the relevant input device or the relevant input location, the relevant input time, and information about the modes of packing of the articles in the respective distribution channels which is stored in the storage unit.

Figure 7:
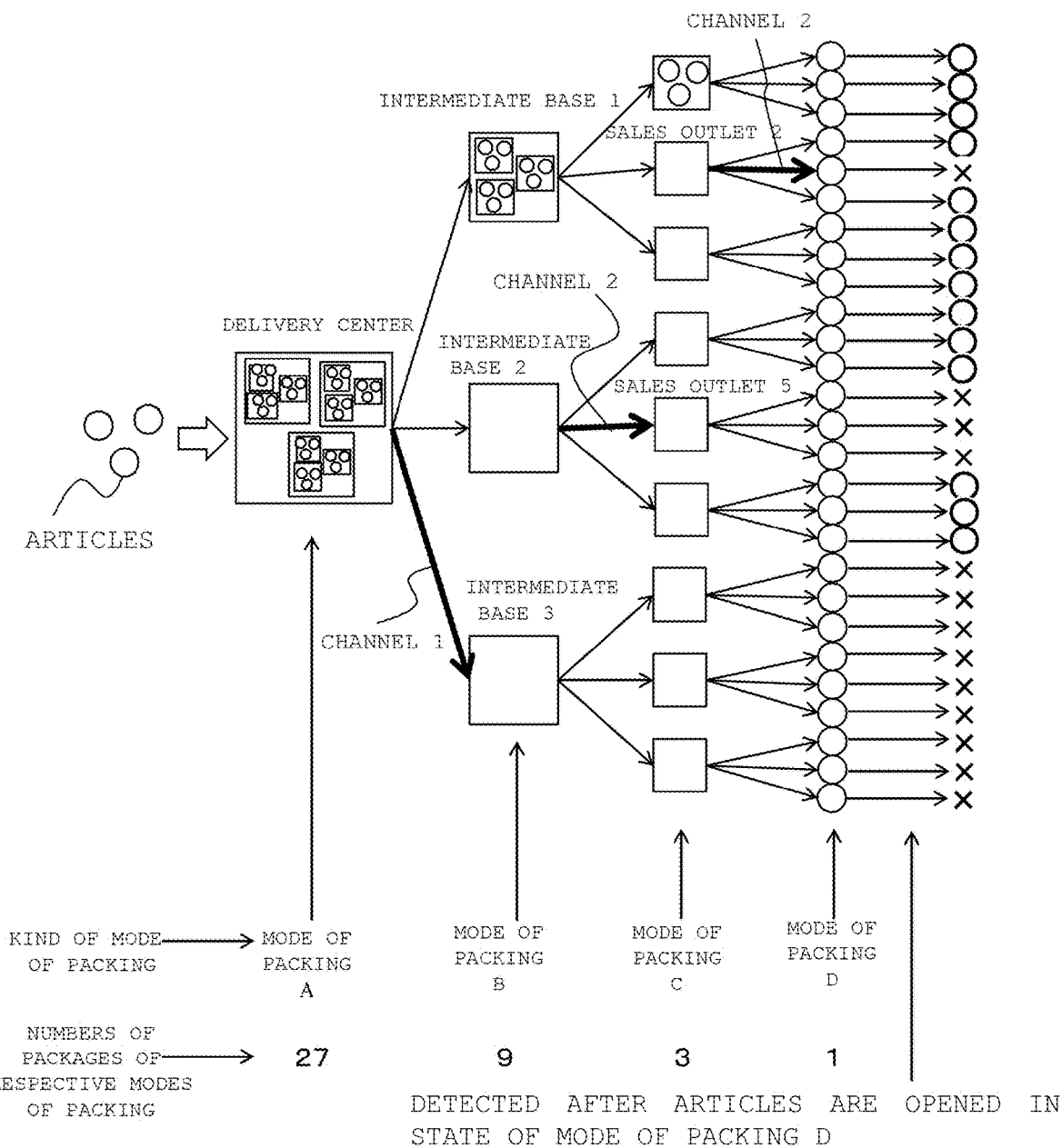
FIG. 7 is a diagram schematically showing distribution channels of articles and changes between the modes of packing of the articles.

FIG. 7 is a diagram showing a work operation in which changed environment portions are read after each article is set to be in the state of the mode of packing D and whether each article is an article of environment abnormality or not is checked to estimate sites where abnormalities have occurred regarding examples of changes between the modes of packing in the distribution channels shown in FIG. 5. In this embodiment, it will be assumed that, when articles that are packed in the same mode of packing are exposed to a certain environment abnormality, these articles change into articles of environment abnormality in the same way. For example, in the case where articles are exposed to an environment abnormality in a channel 1 shown in FIG. 7 (the course of delivery from the delivery center to the intermediate base 3), because the articles are transported in the state of the mode of packing B in the channel 1, nine articles included the mode of packing B change into articles of environment abnormality. Furthermore, when articles are exposed to an environment abnormality in a channel 2 (the course of delivery from the intermediate base 2 to the sales outlet 5), because the articles are transported in the state of the mode of packing C in the channel 2, three articles included in the mode of packing C change into articles of environment abnormality. In addition, in the case where an article is exposed to an environment abnormality in a channel 3 (after a package is opened at the sales outlet 2), because the article is treated in the state of the mode of packing D (the article is in the state of being unpacked), the article changes into an article of environment abnormality.

In the case where the above assumption holds true, when the changed environment portions of three articles delivered to a sales outlet in the state of the mode of packing C are read, when it is found that one or two of the three articles deviate from the control environment, it can be estimated that the one or two articles are exposed to an environment abnormality after being put in the state of the mode of packing D from in the state of the mode of packing C. Furthermore, when all the three articles deviate from the control environment, there is a high possibility that the three articles are exposed to an environment abnormality at a stage in the middle of a distribution channel before reaching the relevant sales outlet. In this case, in consideration of detection results about similar articles distributed to other bases, it becomes possible to estimate at which stage of the distribution channel these articles become articles of environment abnormality. For example, in the case where all articles that are opened to be put in the state of the mode of packing D from in the state of the mode of packing C are articles of environment abnormality and there is not any article among other articles whose data input locations and data input times are near to the data input location and data input time of the above articles of environment abnormality, it can be estimated that the above articles became articles of environment abnormality at a stage of a distribution channel where the above articles are in the state of the mode of packing C.

when there is an article of environment abnormality among the other articles whose information about data input locations and data input times of changed environment portions is near to the data input location and data input time of the above articles of environment abnormality, it is also possible to estimate whether the article has become an article of environment abnormality at a stage of the relevant distribution channel where the article is in the state of the mode of packing A or at a stage of the relevant distribution channel where the article is in the state of the mode of packing B.

As mentioned above, in this embodiment, a stage of a distribution channel that deviates from the control environment can be estimated on the basis of the number of the articles deviating from the control environment, information about the position of the relevant input device and the relevant input location, the relevant input time, and information about the modes of packing in the respective distribution channels stored in the storage unit.

Figure 8:
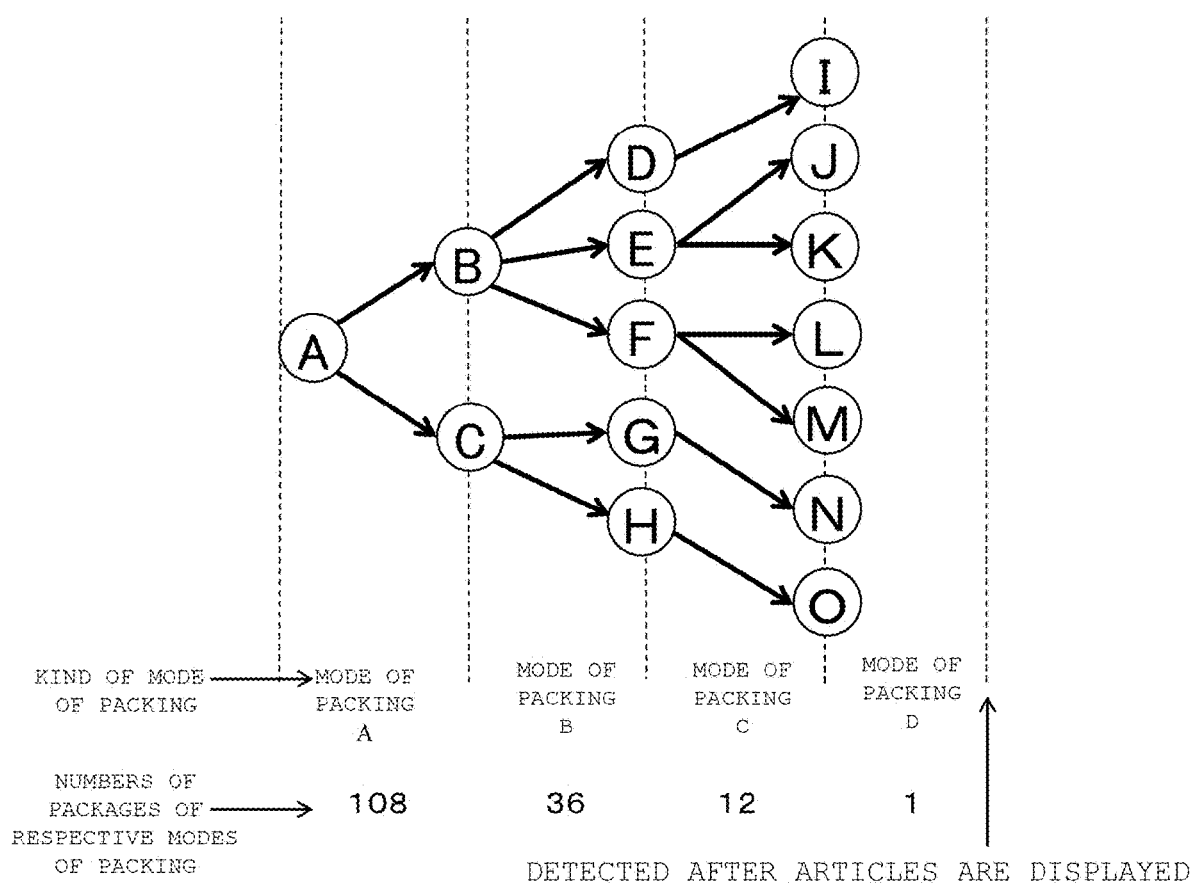
FIG. 8 is a diagram schematically showing distribution channels of articles and changes between the modes of packing of articles.

FIG. 8 is a diagram obtained by adding the stages of opening the modes of packing to the diagram schematically showing the distribution channels of the articles in FIG. 6.

FIG. 9 to FIG. 12 are diagrams showing, as examples, parts of data on the abnormality detection results of changed environment codes and the like that are input at the respective bases I to O and transmitted to the control device 50 in tabular formats.

FIG. 9 shows that one article of environment abnormality found at the base I. In addition, FIG. 9 also shows that two articles of environment abnormality are found at the base N. Because these numbers does not have any correlations with the number of the modes of packing, it can be estimated that these articles become articles of environment abnormality after they are opened to be in the state of the mode of packing D.

FIG. 10 shows that twelve articles of environment abnormality are found among twenty-four articles at the base J. Therefore, there is a possibility that the above articles become articles of environment abnormality after they are opened to be in the state of the mode of packing D at the base J, or there is a possibility that the above articles become articles of environment abnormality at the stage of a distribution channel between the base E and the base J, that is, while they are in the state of the mode of packing C. However, because no article of environment abnormality is detected after articles are opened to be in the state of the mode of packing D at other bases, there is a higher possibility that the above articles become articles of environment abnormality at the stage of the distribution channel where the above articles are in the state of the mode of packing C.

FIG. 11 shows that twelve-four articles of environment abnormality are found among sixty articles at the base L. Furthermore, twelve articles of environment abnormality are found among forty-eight articles at the base M. Therefore, there is a possibility that the twenty-four articles become articles of environment abnormality after they are opened to be in the state of the mode of packing D at the base L, there is a possibility that they become articles of environment abnormality at a stage of a distribution channel between the base F and the base L, that is, while they are in the state of the mode of packing C, and there is a possibility that they become articles of environment abnormality at a stage of the distribution channel between the base B and the base F, that is, while they are in the state of the mode of packing B. On the other hand, there is a possibility that the twelve articles become articles of environment abnormality after they are opened to be in the state of the mode of packing D at the base M, there is a possibility that they become articles of environment abnormality at a stage of a relevant distribution channel between the base F and the base M, that is, while they are in the state of the mode of packing C, and there is a possibility that they become articles of environment abnormality at a stage of the distribution channel between the base B and the base F, that is, while they are in the state of the mode of packing B.

FIG. 12 shows that seventy-two articles of environment abnormality are found among seventy-two articles at the base N. Furthermore, thirty-six articles of environment abnormality are found among thirty-six articles at the base O. Therefore, there is a possibility that the seventy-two articles become articles of environment abnormality after they are opened to be in the state of the mode of packing D at the base N, there is a possibility that they become articles of environment abnormality at a stage of a distribution channel between the base G and the base N, that is, while they are in a state of the mode of packing C, there is a possibility that they become articles of environment abnormality at a stage of the relevant distribution channel between the base C and the base G, that is, while they are in the state of the mode of packing B, and there is a possibility that they become articles of environment abnormality at a stage of the distribution channel between the base A and the base C, that is, while they are in the state of the mode of packing A. On the other hand, there is a possibility that the thirty-six articles become articles of environment abnormality after they are opened to be in the state of the mode of packing D at the base O, there is a possibility that they become articles of environment abnormality at a stage of a distribution channel between the base H and the base O, that is, while they are in the state of the mode of packing C, there is a possibility that they become articles of environment abnormality at a stage of the distribution channel between the base C and the base H, that is, while they are in the state of the mode of packing B, and there is a possibility that they become articles of environment abnormality at a stage of the distribution channel between the base A and the base C, that is, while they are in the state of the mode of packing A.

In the quality control system according to this embodiment, as the number of articles, into which data on changed environment portions are put, gets larger, the relevant estimation accuracy gets higher. In other words, as the number of distributed articles (the number of times changed environment portions are given or read) gets larger, the estimation accuracy gets higher. Therefore, inexpensive temperature-indication marks can be preferably used for performing quality inspection on mass-produced articles by attaching the inexpensive temperature-indicating marks to all the mass-produced articles.

In addition, as a probability that an article becomes an article of environment abnormality gets lower, accuracy for specifying a location where the article becomes an article of environment abnormality becomes higher. In the case where articles whose probability to become articles of environment abnormality is lower and that are packed in a large sized mode of packing are detected, there is a higher probability that these articles have been exposed to an environment abnormality in the large sized mode of packing.

The calculation result of the arithmetic operation unit of the control device and the aggregated results shown in FIG. 9 to FIG. 12 can be displayed on the display device 70 in the forms of a list, a graph, a map, and the like. Detailed measurement data can be displayed in a list, and aggregated values for respective conditions can also be displayed. Aggregated values can also be displayed in the form of a graph. The virtual axis and the horizontal axis of a graph can be used for displaying the values that change according to environment conditions (for example, the values of temperature and humidity), dates, locations, sorts of articles, the number of data, and the like. Furthermore, if dots the number of which is equal to the number of data that satisfy a specific condition are plotted on the positions of a map that displays input locations using the data of input locations, the geographical distribution of the data satisfying this specific condition can be displayed. By analyzing these inspection results, many pieces of information about the fact that environment conditions surrounding articles exceed the initial anticipations can be obtained and these pieces of information can be used for improving the quality control method of the articles.

The utilization method of big data obtained by reading estimation results regarding the stages of distribution channels of articles of environment abnormality is not particularly limited. It is conceivable to estimate the probabilities of the occurrences of articles of environment abnormality at respective bases of distribution channels using a method such as AI and the like.

Second Embodiment

In a second embodiment or later, only parts that are different from those of the first embodiment will be explained, and the explanation about parts that overlap with those of the first embodiment will be omitted.

In a quality control system and a quality control method according to the second embodiment, the amount of information input into input devices is increased in order to make the estimation accuracy of a stage of a distribution channel that deviates from a storage environment higher than the estimation accuracy obtained by the quality control method performed in the first embodiment.

In this embodiment, articles are given control numbers that are different from article to article (hereinafter, these numbers are referred to as individual numbers). Data on changed environment portions and the individual numbers are input into the input units of the input devices at least at the end points of distribution channels. The communication units of the input devices transmit the data on the changed environment portions, the individual numbers, the relevant input locations or information about the positions of the input devices themselves, and the relevant input times to a control device. The arithmetic operation unit of the control device estimates a stage of a distribution channel deviating from the storage environment on the basis of the number of articles deviating from the storage environment, the relevant input locations or the information about the positions of the relevant input devices, the relevant input times, information about the modes of packing of articles in the distribution channels that are stored in a storage unit, and the individual control numbers of the articles deviating from the storage environment.

For example, in the case where individual control numbers are given to individual articles, and the individual control numbers are packed in a sequential number string in a package of a mode of packing, if articles of environment abnormality in a twelve sequential number string are detected at J site in FIG. 10, there is a high possibility that the articles of environment abnormality are generated at a stage of a distribution channel where the articles are in the state of the mode of packing C.

In addition, it is conceivable that the correlation relations between the individual control numbers and the distribution channels are stored in advance in the storage unit. In this case, the information about the positions of the input devices or information about the input locations is not indispensable. The arithmetic operation unit of the control device specifies a distribution channel of articles deviating from the storage environment using the correlation relations between the individual control numbers of the articles and the distribution channels. Afterward, the arithmetic operation unit estimates a stage deviating from the storage environment on the basis of the number of the articles deviating from the storage environment, the distribution channel of the articles deviating from the storage environment, the relevant input time, and information about the modes of packing in the respective distribution channels which is stored in the storage unit.

If the correlation relations between the individual control numbers of the articles and the distribution channels are known, the distribution channel of the articles deviating from the storage environment can be specified on the basis of the individual control numbers of the articles deviating from the storage environment. By estimating a stage of the distribution channel deviating from the storage environment on the basis of the specified distribution channel, information about the mode of packing of the articles in the distribution channel, and the number of the articles deviating from the storage environment, the accuracy of estimating the distribution channel can be improved.

Third Embodiment

In this embodiment, input devices are installed at bases of each distribution channel respectively and changed environment portions and control numbers are input into the input devices at bases located between the start point and the endpoint of each distribution channel. For example, in FIG. 6, data about changed environment portions are also input into input devices located at plural bases among the nodes B to H that are bases located between the start points and end points of distribution channels of articles. Here, it is not necessary that the data should be input at all the bases located between the start points and the endpoints of the distribution channels. Furthermore, the operation of inputting the data into each input device can be Performed at an arbitrary time between the time when articles arrive and the time when the articles are shipped at each of these bases. when the operations of inputting and transmitting data are performed plural times during the storage period of the articles between the time when the articles arrive and the time when the articles are shipped, the states of the articles during the storage period can be more closely grasped.

Each input device transmits the input data, the relevant input time, the relevant input location or information about the position of each input device itself to a control device. Here, in the case where data is input into input devices at plural sites of each distribution channel as is the case with this embodiment, a site at which data is input lastly is the end point of each distribution channel.

The control device estimates a stage of a distribution channel that deviates from the storage environment on the basis of data transmitted from the input devices installed at the intermediate positions of the distribution channels, data transmitted from input devices at the ends of the distribution channels, and information about the modes of packing in the distribution channels.

For example, if an article of environment abnormality is detected as a result of executing reading when the articles in the state of the mode of packing C are divided into articles in the state of the mode of packing D at the base J in FIG.

10, because a possibility that an article becomes the article of environment abnormality after the article becomes in the state of the mode of packing D can be excluded, there is a very high possibility that the article becomes the article of environment abnormality at a stage of the relevant distribution channel where the article is in the state of the mode of packing C.

As described above, by increasing the number of bases where data on changed environment portions are input, the accuracy for estimating sites where environment abnormalities occur can be improved. Meanwhile, data are input even at bases located between the start points and end points of distribution channels, burdens on workers are increased than in the case of the first embodiment. However, because it is not necessary to input data at all the bases located between the start points and end points of the distribution channels, this method can reduce burdens on workers more effectively than a method in which data are input at all the bases located between the start points and end points of the distribution channels.

Fourth Embodiment

It is necessary to bring out articles one-by-one from the state of being packed one-by-one in order to read the changed environment portions of the articles at bases except at bases at the end points of the distribution channels as shown in the third embodiment. In this embodiment, by attaching changed environment portions even to the modes of packing, the accuracy for estimating a site where an environment abnormality occurs can be improved without increasing burdens on workers.

Figure 13:
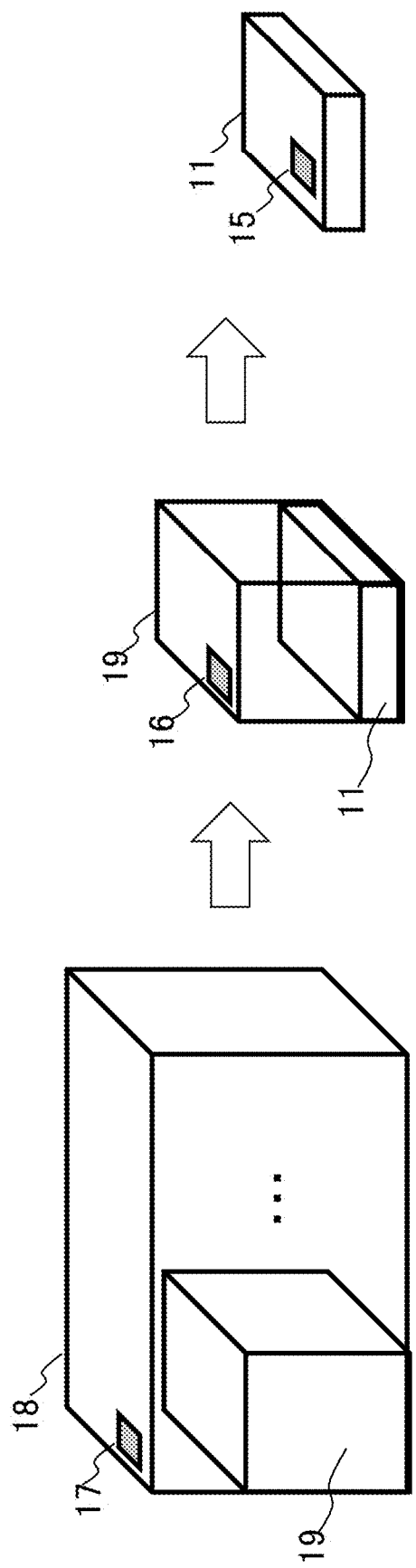
FIG. 13 is a diagram schematically showing examples of changes between the modes of packing at the stages of a distribution channel.

In this embodiment, articles are transported in different modes of packing at different stages of a distribution channel and changed environment portions are attached not only to the articles but also to the modes of packing in which the articles are packed. FIG. 13 shows examples of changes between the modes of packing according to this embodiment. A package 18 is in the state of the mode of packing A including plural packages 19 each of which is in the state of the mode of packing B including plural articles 11. The mode of packing A changes into several modes of packing B, and each mode of packing B changes into several articles 11 that are not packed in a distribution channel. Each article 11 is given a changed environment portion and a control number. In addition, each mode of packing B and each mode of packing A are also given changed environment portions respectively. Furthermore, there is a possibility that conditions that induce environment abnormalities on the surface of an article 11, on the surface of a mode of packing A, and on the surface of a mode of packing B are respectively different from one another. Therefore, it is preferable to adopt an ingenious method in which the changed environment indexes of the change environment portions attached to the surface of the article 11, the surface of the mode of packing A, and the surface of the mode of packing B are made different from one another, or the like.

Input devices are installed at the end point of the distribution channel and at bases of the distribution channel where the modes of packing change in the distribution channel respectively. Workers read changed environment portions for respective modes of packing. Results of the readings are input into the relevant input devices as data about the changed environment portions. The input devices transmit the input data, the relevant input times, the relevant input locations or information about the positions of the input devices themselves to a control device.

The control device estimates a stage of a distribution channel deviating from a storage environment on the basis of the data transmitted from the input devices installed in the middle of the distribution channel, the data transmitted from the input device installed at the end point of the distribution channel, information about the modes of packing of the articles in the distribution channel. If an environment abnormality is detected from data of a changed environment portion of a mode of packing, it turns out that a stage of the distribution channel located before a site at which data about the changed environment portion of this mode of packing is input deviates from the storage environment. In addition, a location at which the data of the changed environment portion is input can be specified on the basis of information about the position of an input device into which the code of the changed environment portion of the mode of packing is input. In other words, a range in the distribution channel within which there is a possibility that the deviation from the storage environment occurs can be narrowed. A stage of the distribution channel deviating from the storage environment is estimated on the basis of this information, the number of articles deviating from the storage environment, the relevant input location or information about the position of the relevant input device, the relevant input time, and information about the modes of packing in the distribution channel stored in a storage unit.

As described above, by attaching changed environment portions to the modes of packing, it becomes possible to read the changed environment portions without opening packages. As a result, the accuracy for estimating a site where an environment abnormality occurs can be improved without increasing burdens on workers.

Furthermore, it is also conceivable that not only changed environment portions but also individual numbers that are different from one mode of packing to another are attached to the modes of packing. In the case where the changed environment portions and the individual numbers that are different from one mode of packing to another (referred to as mode-of-packing individual numbers hereinafter) are attached to the modes of packing, information about the positions of the relevant input devices or information about the relevant input locations are not indispensable. The changed environment portions and the mode-of-packing individual numbers are input into the input devices. The communication units of the input devices transmit read data to the control device. The correlation relations between the mode-of packing individual numbers and information about the modes of packing of the distribution channel are stored in the storage unit of the control device. If the correlation relations between the mode-of packing individual numbers and the distribution channel are known, at which stage of the distribution channel articles in a mode of packing deviating from the storage environment are transmitted can be specified. Therefore, the arithmetic operation unit of the control device can narrow a range in the distribution channel within which there is a possibility that the deviation from the storage environment occurs on the basis of the correlation relations between the mode-of packing individual numbers and information about the modes of packing of the distribution channel stored in the communication unit of the control device. Afterward, the arithmetic operation unit estimates a stage deviating from the storage environment on the basis of the narrowed range, the number of the articles deviating from the storage environment, information about the position of the relevant input device or the relevant input location, the relevant input time, and the information about the modes of packing in the respective distribution channels which is stored by the storage unit.

Fifth Embodiment

A quality control system according to a fifth embodiment transmits a warning to a stage of a distribution channel that is estimated to be deviating from a storage environment after the quality control system estimates the stage of the distribution channel deviating from the storage environment.

Input devices and output devices are installed at respective bases of distribution channels as terminal devices. After the arithmetic operation unit of a control device estimates the stage of the distribution channel deviating from the storage environment, the arithmetic operation unit instructs a data transmission unit to issue the warning to an output device installed at the stage of the distribution deviating from the storage environment. The data transmission unit transmits the warning to the specified output device. After receiving the warning, the output device displays the warning on a display unit.

For example, if it is estimated that a channel from the base B to the base E in FIG. 6 deviates from the storage environment, the warning is displayed on an output device installed at the base B.

Here, a method for issuing a warning to a site estimated to be deviating from the storage environment and a method for stopping the distribution of an article of environment abnormality are not limited to methods described in this embodiment. A warning mark and a distribution stop mark are attached to each changed environment portion, and it is conceivable that the distribution of an article of environment abnormality is stopped when the distribution stop mark, which is issued to at a base of a distribution channel where the warning mark has been developing a color for several days, develops a color.

In addition, the present invention is not limited to the above embodiments, and the present invention may include various kinds of modification examples. The above embodiments been described in detail in order to explain the present invention in an easily understood manner, and the present invention is not necessarily limited to the embodiments which includes all configurations that have been described so far. Furthermore, apart of the configuration of one embodiment can be replaced with a part of the configuration of another embodiment. It is also possible to add the configuration of one embodiment to the configuration of another embodiment. In addition, a new embodiment of the present invention may be made by deleting a part of the configuration of each embodiment, by adding another configuration to a part of the configuration of each embodiment, or by replacing a part of configuration of each embodiment with another configuration.

LIST OF REFERENCE SIGNS 10, 11 . . . Article, 14, 18, 19 . . . Package, 12 . . . Two-Dimensional Bar-Code, 13 . . . One-Dimensional Bar-Code, 15, 16, 17 . . . Changed Environment Portion and Bar-Code, 21, 22, 23, 24, 25 . . . Changed Environment Portion, 50 . . . Control Device, 51 . . . Data Reception Unit, 52 . . . Arithmetic Operation Unit, 53 . . . Data Storage Unit, 54 . . . Data Transmission Unit, 60 . . . Input Device, 70 . . . Output Device

The invention claimed is:

1. A quality control system for controlling the quality of articles each of which is given a changed environment portion, which changes when an environment surrounding each article deviates from a storage environment, and a control number, the quality control system comprising:
    a control device;
    an output device; and
    an input device placed at least at each of the end points of distribution channels of the articles,
    wherein the input device includes
        an input unit to which data on the changed environment portion is input and
        a communication unit that transmits, to the control device, the data on the changed environment portion input to the input unit, the relevant input location or information about the position of the input device itself, and the relevant input time;
    the control device includes
        a storage unit for storing information about the modes of packing of the articles in the distribution channels,
        a reception unit for receiving the information transmitted from the input device,
        an arithmetic operation unit that calculates the number of articles exposed to an environment deviating from the storage environment on the basis of the data on the changed environment portion which is received by the reception unit and that estimates a stage of a distribution channel in an environment deviating from the storage environment on the basis of the number of the articles exposed to an environment deviating from the storage environment, the input location or the information about the position of the input device, the input time, and the information about the modes of packing of the articles in the distribution channels which is stored by the storage unit, and
        a transmission unit for transmitting a calculation result to the output device; and
    the output device includes a display unit for displaying the calculation result.

2. The quality control system according to claim 1, wherein the control numbers given to the articles are individual control numbers different from one another;
    the individual control numbers are further input to the input unit;
    the communication unit further transmits the individual control numbers to the control device; and
    the arithmetic operation unit that estimates stages of the distribution channel in an environment deviating from the storage environment on the basis of the number of the articles exposed to an environment deviating from the storage environment, the input location or the information about the position of the input device, the input time, the information about the modes of packing of the articles in the distribution channels, and the individual control numbers of the articles exposed to an environment deviating from the storage environment.

3. The quality control system according to claim 2, wherein the storage unit stores the correlation relations between the individual control numbers and the distribution channels,
    the arithmetic operation unit specifies a distribution channel of the articles deviating from the storage environment on the basis of the correlation relations between the individual control numbers and the distribution channels stored in the storage unit, the individual control number of the articles exposed to an environment deviating from the storage environment, and estimates a stage of a distribution channel in an environment deviating from the storage environment on the basis of the calculated number of the articles exposed to an environment deviating from the storage environment, the input location or the information about the position of the input device, the input times, the information about the modes of packing of the articles in the distribution channels which is stored by the storage unit, and the specified distribution channel of the articles exposed to an environment deviating from the storage environment.

4. The quality control system according to claim 1, wherein the articles are transmitted in the modes of packing different from one another according to the stages of the distributed channels, changed environment portions are displayed on the modes of packing, the input devices are installed at the end points of the distribution channels and at bases of the distribution channels where the modes of packing change, and the arithmetic operation unit estimates a stage of the distribution channel in an environment deviating from the storage environment on the basis of the number of the articles exposed to an environment deviating from the storage environment, the input locations or the information about the positions of the input devices, the input times, information about the modes of packing in the distribution channels that are stored in the storage unit, and data on the changed environment portions of the modes of packing.

5. The quality control system according to claim 4, wherein individual numbers that are different from one mode of packing to another are attached to the modes of packing.

6. The quality control system according to claim 1, wherein a warning is displayed on an output device installed at the base of the distribution channel that is estimated to be deviating from the storage environment by the arithmetic operation unit.

7. The quality control system according to claim 1, wherein the event that the deviation from the storage environment has occurred can be detected with eyes by checking the changed environment portions.

8. The quality control system according to claim 1, wherein the control numbers are displayed on articles as one-dimensional bar-codes or two-dimensional bar-codes.

9. A quality control method for controlling the quality of articles each of which is given a changed environment portion, which changes when an environment surrounding each article deviates from a storage environment, and a control number, the quality control method comprising:

calculating the number of articles exposed to an environment deviating from the storage environment on the basis of the presence or absence of the changes of the changed environment portions of articles at least at the end points of distribution channels for the articles; and estimating a stage in an environment deviating from the storage environment on the basis of the number of the articles exposed to an environment deviating from the storage environment, information about the positions of the bases of the distribution channels where the presence or absence of the changes of the changed environment portions is checked, a time when the presence or absence of the changes of the changed environment portions is checked, and information about the modes of packing in the distribution channels.

10. The quality control method according to claim 9, wherein the control numbers given to the articles are individual control numbers different from one another; and the quality control method estimates a stage in an environment deviating from the storage environment on the basis of the number of the articles exposed to an environment deviating from the storage environment, the information about the positions of the bases of the distribution channels where the presence or absence of the changes of the changed environment portions is checked, the time when the presence or absence of the changes of the changed environment portions is checked, the information about the modes of packing in the distribution channels, and the control numbers of the articles deviating from the storage environment.

11. The quality control method according to claim 9, wherein the articles are transmitted in the modes of packing different from one distribution channel to another;

changed environment portions are displayed on the modes of packing;

the number of modes of packing exposed to an environment deviating from the storage environment is calculated on the basis of the presence or absence of the changes of the changed environment portions of the modes of packing at the bases of the distribution channels where the modes of packing change, and the number of articles packed in the mode of packing deviating from the storage environment is calculated on the basis of information about the modes of packing in the respective distribution channels; and a stage of a distribution channel in an environment deviating from the storage environment is estimated on the basis of the number of the articles exposed to an environment deviating from the storage environment, information about the positions of the bases of the distribution channels where the presence or absence of the changes of the changed environment portions is checked, a time when the presence or absence of the changes of the changed environment portions is checked, information about the modes of packing in the distribution channels, and the number of the articles packed in the mode of packing deviating from the storage environment.

12. The quality control method according to claim 9, wherein a warning is issued to a base of a distribution channel deviating from the storage environment.

\* \* \* \* \*